United States Patent
Niwa et al.

(10) Patent No.: US 7,268,961 B2
(45) Date of Patent: Sep. 11, 2007

(54) COLOR WHEEL, AND METHOD AND JIG FOR PRODUCING SAME

(75) Inventors: Shinichi Niwa, Iwata-gun (JP);
Toshiaki Asakawa, Iwata-gun (JP);
Shigeyuki Adachi, Iwata-gun (JP);
Kuniyuki Takao, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 304 days.

(21) Appl. No.: 11/053,840

(22) Filed: Feb. 10, 2005

(65) Prior Publication Data
US 2006/0103813 A1    May 18, 2006

(30) Foreign Application Priority Data
Nov. 9, 2004  (JP)  ............... 2004-325007

(51) Int. Cl.
*G02B 5/22* (2006.01)
(52) U.S. Cl. .............. 359/891; 359/885; 359/889; 359/892; 348/743; 356/418; 353/84
(58) Field of Classification Search .......... 359/891, 359/892, 885, 889; 348/743; 356/418; 353/84
See application file for complete search history.

(56) References Cited

U.S. PATENT DOCUMENTS

| | | | |
|---|---|---|---|
| 4,800,474 A | 1/1989 | Bornhorst | |
| 5,257,332 A | 10/1993 | Pimpinella | |
| 5,868,482 A | 2/1999 | Edlinger et al. | |
| 6,011,662 A | 1/2000 | Evans | |
| 6,024,453 A | 2/2000 | Edlinger et al. | |
| 6,574,046 B1 * | 6/2003 | Shioya | 359/618 |
| 6,702,446 B2 | 3/2004 | De Vaan et al. | |
| 6,715,887 B2 | 4/2004 | Chang | |
| 6,813,087 B2 | 11/2004 | Davis | |
| 2002/0005914 A1 | 1/2002 | Tew | |
| 2002/0105729 A1 | 8/2002 | Richards et al. | |
| 2003/0142241 A1 * | 7/2003 | Allen et al. | 348/742 |
| 2004/0095767 A1 | 5/2004 | Ohmae et al. | |
| 2005/0018145 A1 | 1/2005 | Kwon et al. | |
| 2005/0128614 A1 * | 6/2005 | Kao et al. | 359/892 |

FOREIGN PATENT DOCUMENTS

| | | |
|---|---|---|
| JP | A 3-122903 | 5/1991 |
| JP | A 5-90391 | 4/1993 |

(Continued)

*Primary Examiner*—Leonidas Boutsikaris
(74) *Attorney, Agent, or Firm*—Oliff & Berridge, PLC

(57) ABSTRACT

In a color wheel comprising a plurality of color filter segments arranged so as to form a disk and a support member fixed to the color filter segments, the color filter segments are each outlined only by a circular arc and two straight lines passing through the center of the disk. Consequently, each of the color filter segments is prepared by cutting the material only to the circular arc and the two straight lines, thereby simplifying the production process. And, the support member can be duly and surely positioned such that the center of the support member is set to coincide with the intersecting point of the two straight lines. Thus, the positional accuracy, the component cost reduction, and the production cost reduction can be achieved at the same time.

2 Claims, 5 Drawing Sheets

FOREIGN PATENT DOCUMENTS

| | | |
|---|---|---|
| JP | A 6-347639 | 12/1994 |
| JP | A 10-048542 | 2/1998 |
| JP | A 11-115711 | 4/1999 |
| JP | A 11-222664 | 8/1999 |
| JP | A 2000-239830 | 9/2000 |
| JP | A 2001-73136 | 3/2001 |
| JP | A 2003-50309 | 2/2003 |
| JP | A 2003-57424 | 2/2003 |
| JP | A 2004-101827 | 4/2004 |
| WO | WO94/25796 A1 | 11/1994 |

* cited by examiner

Fig. 4A
Fig. 4B
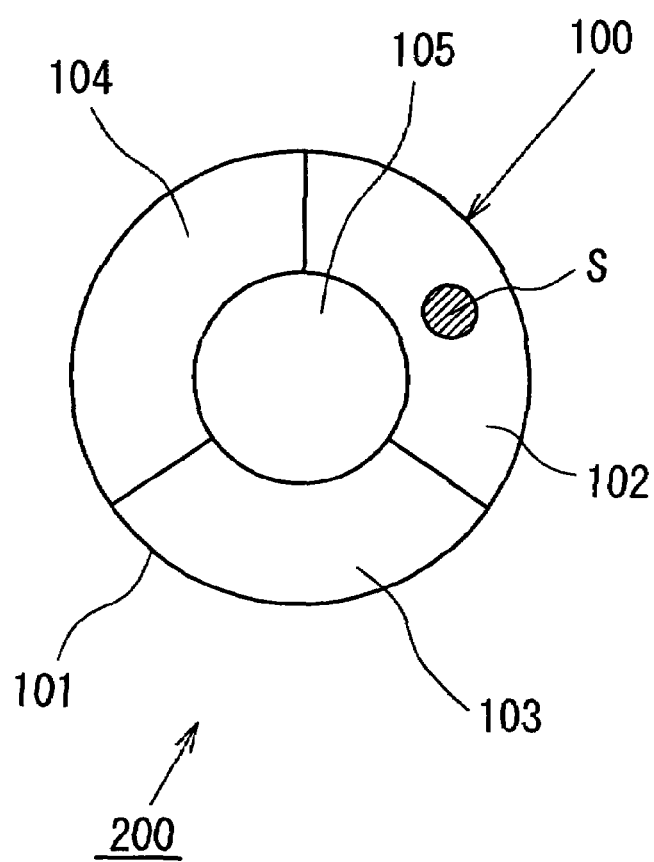
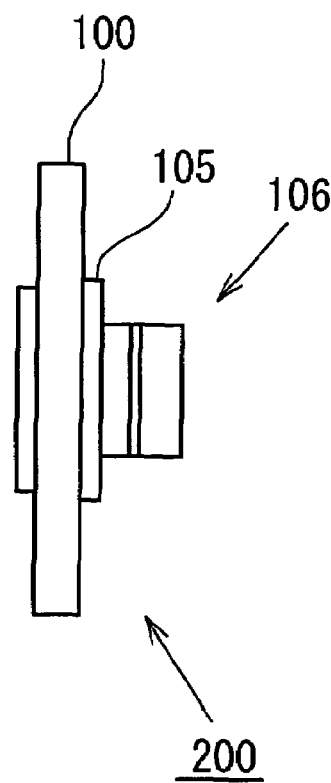

COLOR WHEEL, AND METHOD AND JIG FOR PRODUCING SAME

BACKGROUND OF THE INVENTION

1. Field of the Invention

The present invention relates to a color wheel suitable for use as a filter element of a time-share light dispersing device, and more specifically to a color wheel of segment type.

2. Description of the Related Art

Color composition in a projection-type image display apparatus has conventionally been accomplished commonly by a method, such as: a single-panel method, in which one light valve element adapted to control light amount per pixel thereby creating an image is used to disperse each pixel into R (red), G (green), and B (blue) lights; and a three-panel method, in which three light valve elements dedicated to R, G and B lights, respectively, are used to produce R, G and B images in parallel, and then the three images thus produced are composed. Recently, as a light valve element capable of fast switching, such as a ferroelectric liquid crystal display element or a digital micro-mirror device, is increasingly coming into practical use, a time-sharing single-panel method is widely used. In the time-sharing single-panel method, R, G and B lights are caused to sequentially impinge on one light valve element, the light valve element is driven in synchronization with switching-over of the R, G and B lights thereby producing R, G and B images in a time-series manner, and the images thus produced are projected onto a screen, or the like. Here, color composition of the images is accomplished by a viewer due to an afterimage effect occurring at a sense of vision. In the time-sharing single-panel method, reduction in both dimension and weight of the apparatus, which is a feature of a single-panel method, can be achieved by employing a relatively simple optical system, and therefore the time-sharing single-panel method is favorable for realizing inexpensive fabrication of a projection-type image display apparatus. In such an image display apparatus, a color wheel is preferably used as a filter element of a time-share light dispersing device to sequentially disperse light emitted from a white light source into R, G and B lights having respective wavelength bands in a time-sharing manner.

FIGS. 4A and 4B are respectively top plan and side views of a conventional and typical color wheel assembly 200 as a time-share light dispersing device including such a color wheel. Referring to FIG. 4B, the color wheel assembly 200 comprises a color wheel 100, and a driving motor 106 including a motor hub 105. The color wheel 100 is a tricolor color wheel and is composed of a disk-like substrate 101 made of a light-transmitting material, for example, optical glass, and three pie-shaped (sectorial) filters 102, 103 and 104 adapted to transmit exclusively, for example, R, G and B lights, respectively are formed on a surface of the substrate 101. The color wheel 100 thus structured is fixedly attached to the motor hub 105 coaxially therewith. The color wheel assembly 200 operates such that the color wheel 100 is spun by the driving motor 106 so that white light S impinges sequentially on the filters (R, G and B) 102, 103 and 104 whereby the white light S is sequentially dispersed into R, G and B lights.

FIGS. 5 and 6 are respectively plan and exploded side sectional views of a conventional segment type color wheel 160, which is produced such that respective color filter segments separately prepared in a sectorial shape are fixedly attached to one another so as to form a disk. The color wheel 160 comprises a plurality (four in FIG. 5) of sectorial color filter segments 112, 114, 116 and 118 which are separately prepared and are fixed in position by means of a support member 120 and a clamp member 122 so as to form a disk.

Specifically, as shown in FIG. 6, respective inner circumferences 112a, 114a, 116a and 118a of the segments 112, 114, 116 and 118 are fitted to an outer circumference of a smaller cylinder portion 120a of the support member 120 whereby the color filter segments 112, 114, 116 and 118 are duly set in position in the radial direction of the color wheel 160, and respective surfaces of the color filter segments 112, 114, 116 and 118 toward the inner circumferences 112a, 114a, 116a and 118a are fitted to an annular seat portion 120b of the support member 120 whereby the color filter segments 112, 114, 116 and 118 are duly set in position in the thickness direction of the color wheel 160. Then, a smaller cylinder portion 122a of the clamp member 122 is engagingly inserted into a hollow 120c of the support member 120 so that an annular seat portion 122b of the clamp member 122 and the aforementioned annular seat portion 120b of the support member 120 sandwich and clamp the inner circumferential portions of the color filter segments 112, 114, 116 and 118. And, when the support member 120 and the clamp member 122 are bonded or screwed together, the color filter segments 112, 114, 116 and 118 are fixed in position. The color wheel 160 thus structured is fixedly attached to a hub (such as the hub 105 shown in FIGS. 4A and 4B) of a motor (such as the driving motor 106 shown in FIG. 4B) such that the hub is inserted in a hollow 122c of the clamp member 122 (refer to, for example, Japanese Patent Applications Laid-Open Nos. 2004-101827 ([0010], and FIG. 4 therein) and H10-48542 (claim 1, and FIG. 2 therein)).

The production cost reduction of a color wheel is incessantly demanded. In producing a conventional segment-type color wheel, for example, the aforementioned color wheel 160, each of the color filter segments 112, 114, 116 and 118 needs the process of cutting the material to its outer circumference defined as circular arc, two straight lines passing through the center point of the resulting disk, and the inner circumference 112a/114a/116a/118a to precisely position each segment, which inhibits the simplification of the production process thus making it difficult to achieve cost reduction.

SUMMARY OF THE INVENTION

The present invention has been made in view of the above circumstance, and it is an object of the present invention to simplify the production process of a color filter segment for reducing the production cost of a color wheel while ensuring accuracy of positioning each segment.

In order to achieve the object, according to a first aspect of the present invention, a color wheel comprises a plurality of color filter segments which are arranged so as to form a disk, and each of which are outlined only by a circular arc and two straight lines passing through the center of the disk formed.

In the first aspect of the present invention, the color wheel may further comprise a support member attached fixedly and directly to the plurality of color filter segments such that the center of the support member coincides with the intersecting point of the two straight lines.

In the first aspect of the present invention, the plurality of color filter segments may be attached fixedly and directly to either a hub or a rotating portion of a motor such that the intersecting point of the two straight lines coincides with the center of the hub or the rotating portion of the motor.

According to a second aspect of the present invention, there is provided a method of producing a color wheel including: a plurality of color filter segments which are arranged so as to form a disk, and each of which is outlined by a circular arc and two straight lines passing through a center of the disk; and a support member which is attached fixedly and directly to the plurality of color filter segments. The method comprises the steps of: arranging the plurality of color filter segments with reference to arced circumferential surfaces thereof; and centrally aligning the support member with reference to the arced circumferential surfaces of the plurality of color filter segments and fixing the support member to the plurality of color filter segments.

In the second aspect of the present invention, the method may further include a step of fixedly attaching the plurality of color filter segments to either a hub or a rotating portion of a motor, and in the methods either the hub or the rotating portion of the motor may be centrally aligned with reference to the arced circumferential surfaces of the plurality of color filter segments.

According to a third aspect of the present invention, there is provided a jig for producing a color wheel including: a plurality of color filter segments which are arranged so as to form a disk, and each of which is outlined by a circular arc and two straight lines passing through a center of the disk; and a support member which is fixedly attached to the plurality of color filter segments. The jig comprises (a) a main body including: a bottom portion having a flat seat functioning to receive thereon the plurality of color filter segments in a disk arrangement, and a through-hole going through the flat seat and functioning to receive and position the support member with reference to an outer circumferential surface of the support member; and a wall portion having a surface to which arced circumferential surfaces of the plurality of color filter segments are fitted, (b) an inserter functioning to insert the support member into the through-hole of the main body, and (c) a presser functioning to press the plurality of color filter segments against the support member.

In the third aspect of the present invention, the inserter may further function to insert into the through-hole of the main body either a hub or a rotating portion of a motor which is to be attached to the plurality of color filter segments, and the presser may further function to press the plurality of color filter segments against the hub or the rotating portion of the motor.

Advantages resulted from the present invention summarized above will be explained herein later.

BRIEF DESCRIPTION OF THE DRAWINGS

FIGS. 4A and 4B are respectively plan and side views of a typical color wheel assembly;

DETAILED DESCRIPTION OF THE PREFERRED EMBODIMENT

Figure 1A:
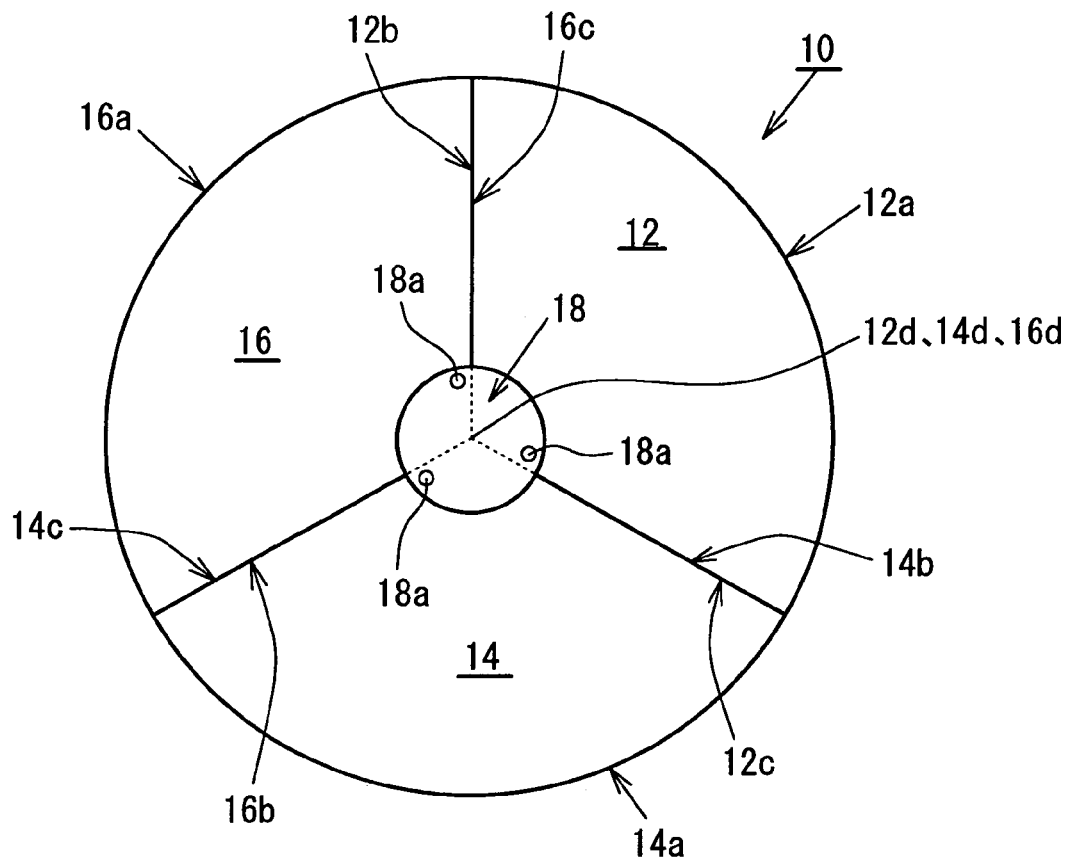
FIGS. 1A and 1B are respectively plan and side (exploded and partly sectioned) views of a color wheel assembly including a segment-type color wheel according to an embodiment of the present invention, and a motor to rotate the color wheel.
Figure 1B:
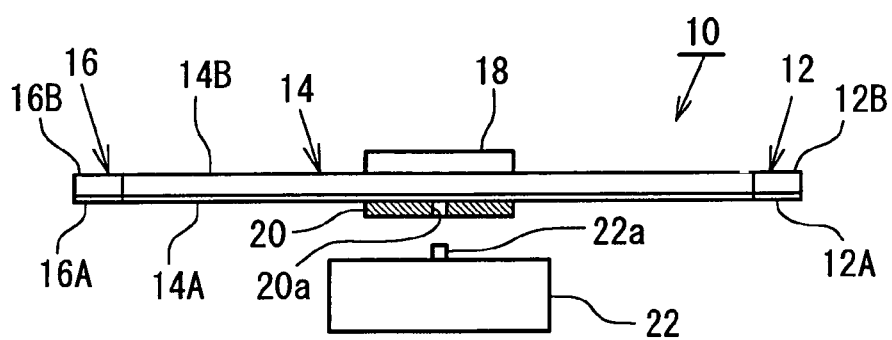

The present invention will be described with reference to the accompanying drawings. Referring to FIG. 1A, a color wheel 10 according to an embodiment of the present invention is a segment-type color wheel comprising color filter segments 12, 14 and 16. The color filter segments 12, 14 and 16 are outlined only by respective circular arcs 12a, 14a and 16a, and respective two straight lines 12b/12c, 14b/14c and 16b/16c passing through the center point of the color wheel 10 to be assembled, and have a support member 18 and a motor hub 20 fixedly attached directly thereto such that intersecting points 12d, 14d and 16d of the straight lines 12b/12c, 14b/14c and 16b/16c coincide with the center points of the support member 18 and the motor hub 20. The support member 18 has balancing holes 18a and is adhesively fixed to one surfaces of the segments 12, 14 and 16, and the motor hub 20 has a shaft hole 20a to engage with a motor shaft 22a of a motor 22 and is adhesively fixed to the other surfaces of the color filter segments 12, 14 and 16. The motor 22 and motor hub 20 are fixed to each other adhesively or mechanically (press-fitting, screwing, or the like). Referring to FIG. 1B, the color filter segments 12, 14 and 16 comprise respective dichroic filters 12A, 14A and 16A, and respective substrates 12B, 14B and 16B.

Figure 2:
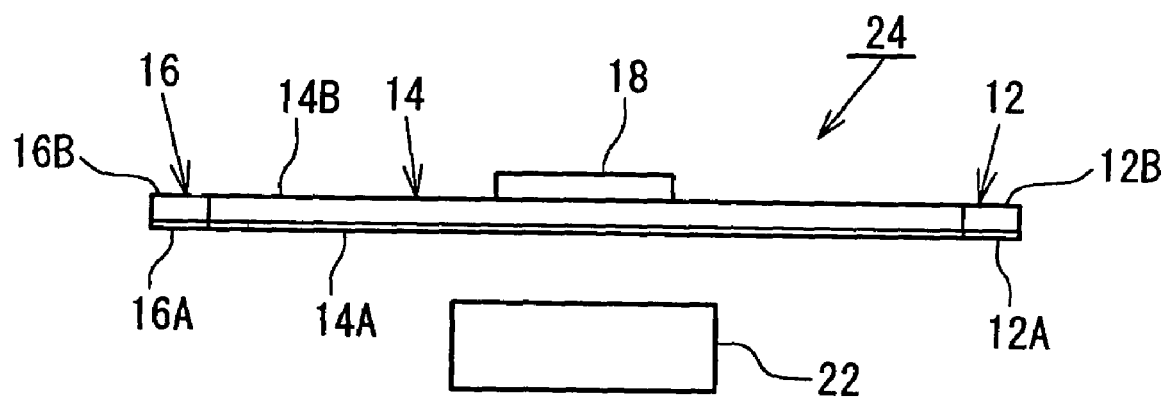
FIG. 2 is an exploded side view of a color wheel assembly involving a modified way of attaching the segment-type color wheel shown in FIG. 1B to the motor.

Referring to FIG. 2, a color wheel 24 involves a modification made to the arrangement for the color wheel 10 described above with reference to FIG. 1B. The modification is that no motor hub is provided at surfaces of the color filter segments 12, 14 and 16 opposite to surfaces having the support member 18, and the color filter segments 12, 14 and 16 are adhesively fixed to a rotating portion of the motor 22 without any mediate component therebetween. Thus, the number of components is reduced. The arrangement otherwise is the same as shown in FIG. 1B, and an explanation thereof will be omitted.

Figure 3:
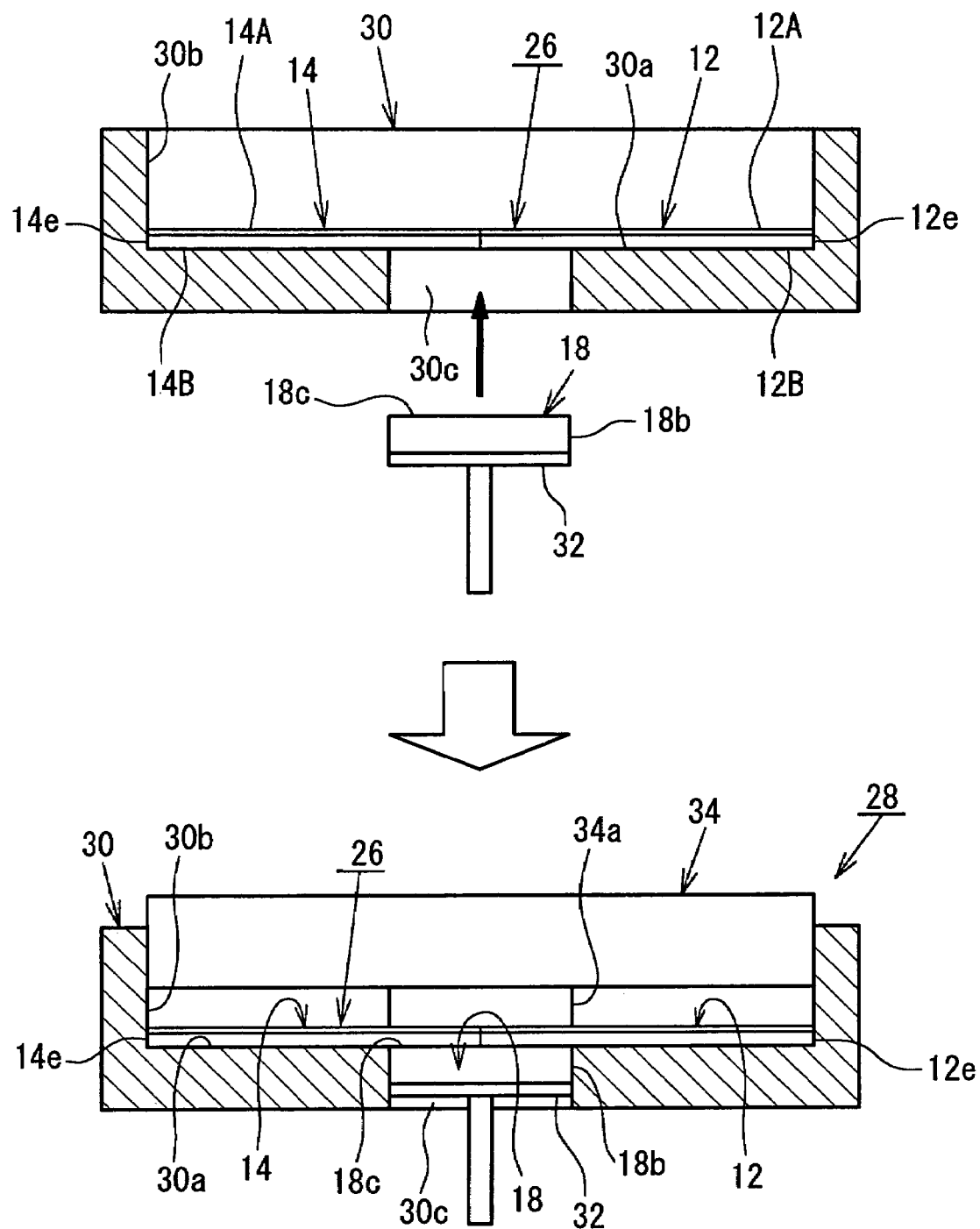
FIG. 3 is an explanatory view of a jig and a method for producing a color wheel according to the present invention.
Figure 5:
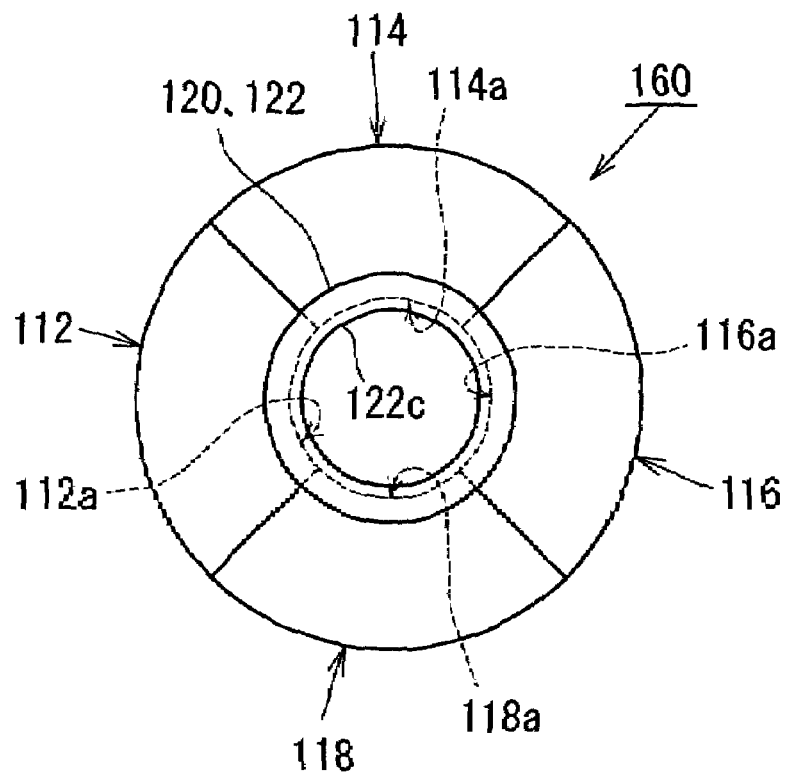
FIG. 5 is a plan view of a conventional segment-type color wheel.
Figure 6:
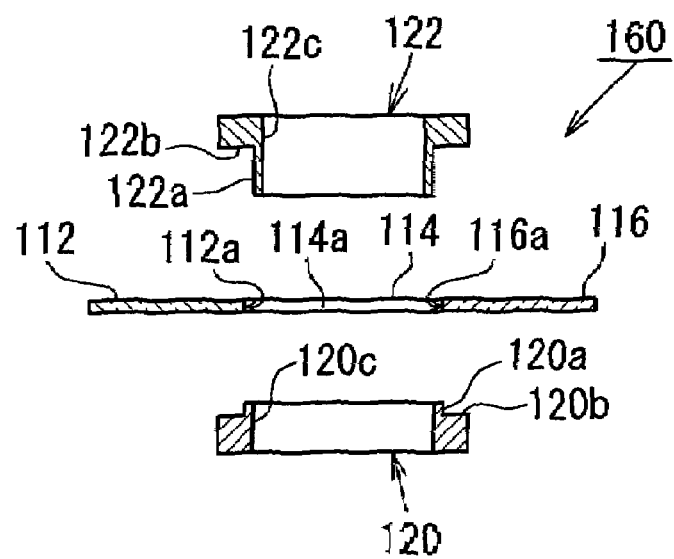
FIG. 6 is an exploded sectional view of the color wheel of FIG. 5.

Referring now to FIG. 3, a jig 28 for producing a color wheel 26 is composed of a main body 30, an inserter 32, and a presser 34. The color wheel 26 in the figure comprises a plurality of color filter segments 12, 14, and so on (only the color filter segments 12 and 14 are shown in the figure for convenience of illustration) which are fixed directly to a support member 18. The main body 30 is shaped in a hollow-cylinder which integrally includes a bottom plate defining, at its upper side, a flat seat 30a configured circular so as to receive the color filter segments 12, 14, and so on in a circular arrangement, and which includes a wall having an inner circumferential surface 30b defined at its inner cylindrical face. The bottom plate has a through-hole 30c positioned at the center of the flat seat 30a, and the support member 18 is duly positioned with reference to its outer circumferential surface 18b when it is inserted in the through-hole 30c and put in contact with the color filter segments 12, 14, and so on.

The inserter 32 is for putting the support member 18 into the through-hole 30c, and the presser 34 includes a protrusion 34a adapted to press down the color filter segments 12, 14, and so on against a flat surface 18c of the support member 18 and toward the flat seat 30a of the bottom plate of the main body 30.

A production method using the jig 28 for producing the color wheel 26 will now be explained with reference to FIG. 3. As shown in the upper side of FIG. 3, the color filter segments 12, 14, and so on are placed in a hollow space defined by the inner circumferential surface 30b of the main body 30, such that respective substrates 12B, 14B, and so on of the color filter segments 12, 14, and so on are stuck closely on the flat seat 30a of the main body 30, and that respective arced circumferential surfaces 12e, 14e, and so on of the color filter segments 12, 14, and so on are in contact with the inner circumferential surface 30b of the main body 30, whereby the color filter segments 12, 14, and so on are arranged with the arced circumferential surfaces 12e, 14e, and so on aligned to the inner circumferential surface 30b of the main body 30 so as to form a disk configuration.

Then, the support member 18 is placed on the inserter 32 and put thereby into the though-hole 30c of the main body 30 with its outer circumferential surface 18b guided to the inner circumferential surface of the though-hole 30c, so that the support member 18 has its flat surface 18c brought in contact with the color filter segments 12, 14, and so on, and is duly positioned with respect to the arced circumferential surfaces 12e, 14e, and so on of the color filter segments 12, 14, and so on. Referring now to the lower side of FIG. 3, the presser 34 is put in the hollow space of the main body 30 so that the protrusion 34a of the presser 34 presses the color filter segments 12, 14, and so on firmly and closely against the flat surface 18c of the support member 18 placed on the inserter 32 and against the flat seat 30a of the main body 30. Here, adhesive is previously applied to the flat surface 18c of the support member 18 so that the support member 18 is fixed to the substrates 12B, 14B, and so on of the color filter segments 12, 14, and so on. In this connection, following the procedure described above, the motor hub 20 (refer to FIG. 1B) or the rotating portion of the motor 22 (refer to FIG. 3) can be duly positioned and fixed to the color filter segments 12, 14, and so on in the same way.

The present invention discussed above has the following advantages.

According to the aforementioned color wheel 10/24/26, the color filter segments 12, 14 and 16 are outlined only by the respective circular arcs 12a, 14a and 16a, and the respective two straight lines 12b/12c, 14b/14c and 16b/16c passing through the center point of the color wheel 10/24/26 to be assembled. Consequently, the color filter segments 12, 14 and 16 can be prepared by cutting the substrate material only to the respective circular arcs 12a, 14a and 16a, and the respective two straight lines 12b/12c, 14b/14c and 16b/16c, thus simplifying the production procedure. Also, since the intersecting points 12d, 14d and 16d of the respective two straight lines coincide with the center point of the support member and/or the motor hub 20 or the rotating portion of the motor 22, the positional accuracy of the components, the reduction of component cost, and the reduction of production cost can be achieved at the same time.

According to the method of producing the color wheel 10/24/26, since the color filter segments 12, 14 and 16 are prepared by cutting the substrate material only to the respective circular arcs 12a, 14a and 16a, and the respective two straight lines 12b/12c, 14b/14c and 16b/16c, the production procedure can be simplified. Further since the color filter segments 12, 14 and 16 can be duly arranged in position with reference to their respective arced circumferential surfaces 12e, 14e and 16e, and since the support member 18 and/or the motor hub 20 or the rotating portion of the motor 22 is centrally positioned with respect to the arced circumferential surfaces 12e, 14e and 16e, the support member 18 and/or the motor hub 20 or the rotating portion of the motor 22 can be precisely positioned without using the rotational center of the color wheel 10/24/26 as the reference, and accordingly the color filter segments 12, 14 and 16 do not have to be prepared with inner circumferences which are conventionally formed at an area corresponding to the central portion of a color wheel, thus eliminating the process of forming the inner circumferences.

And, according to the jig 28 for producing the color wheel 10/24/26, the color filter segments 12, 14 and 16 are placed on the flat seat 30a of the main body 30 such that the arced circumferential surfaces 12e, 14e and 16e are closely fitted to the inner circumferential surface 30b of the main body 30, whereby the color filter segments 12, 14 and 16 can be duly positioned. Then, the support member 18 and/or the motor hub 20 or the rotating portion of the motor 22 is put in the through-hole 30c of the main body 30 by means of the inserter 32, and the color filter segments 12, 14 and 16 are pressed, by means of the presser 34, against the support member 18 and/or the motor hub 20 or the rotating portion of the motor 22, and the flat seat 30a of the main body 30, whereby the support member 18 and/or the motor hub 20 or the rotating portion of the motor 22 can be duly positioned with reference to the arced circumferential surfaces 12e, 14e and 16e of the color filter segments 12, 14 and 16. Consequently, the color filter segments 12, 14 and 16, and the support member 18 and/or the motor hub 20 or the rotating portion of the motor 22 can be precisely positioned with respect to each other without using the rotational center of the color wheel 10/24/26 as the reference, and can also be securely attached to each other.

The flat seat 30a of the main body 30 does not have to be configured circular as long as the color filter segments 12, 14 and 16 can be stably received thereon, and the inner circumference surface 30b of the main body does not have to be formed into a cylindrical surface as long as the color filter segments 12, 14 and 16 can be precisely positioned.

Obviously, many modifications and variations of the present invention are possible in light of the above teachings. Thus, it is to be understood that, within the scope of the appended claims, the invention may be practiced otherwise than as specifically described above.

What is claimed is:

1. A jig for producing a color wheel including: a plurality of color filter segments which are arranged so as to form a disk, and each of which is outlined by a circular arc and two straight lines passing through a center of the disk; and a support member which is fixedly attached to the plurality of color filter segments, the jig comprising:

a main body including
a bottom portion having a flat seat functioning to receive thereon the plurality of color filter segments in a disk arrangement, and a through-hole going through the flat seat and functioning to receive and position the support member with reference to an outer circumferential surface of the support member, and
a wall portion having a surface to which arced circumferential surfaces of the plurality of color filter segments are fitted;
an inserter functioning to insert the support member into the through-hole of the main body; and
a presser functioning to press the plurality of color filter segments against the support member.

2. A jig for producing a color wheel, according to claim 1, wherein the inserter further functions to insert into the through-hole of the main body one of a hub and a rotating portion of a motor which is to be attached to the plurality of color filter segments, and the presser further functions to press the plurality of color filter segments against either the hub or the rotating portion of the motor.

* * * * *